United States Patent [19]

Kim

[11] Patent Number: 5,796,451
[45] Date of Patent: Aug. 18, 1998

[54] LIQUID CRYSTAL CELL WITH AN EXTERNAL COLOR FILTER

[75] Inventor: Si-hwan Kim, Seoul, Rep. of Korea

[73] Assignee: Samsung Display Devices Co., Ltd., Suwon, Rep. of Korea

[21] Appl. No.: 865,294

[22] Filed: May 29, 1997

Related U.S. Application Data

[63] Continuation of Ser. No. 541,422, Oct. 10, 1995, abandoned.

[30] Foreign Application Priority Data

Oct. 23, 1993 [KR] Rep. of Korea ............... 93-22117

[51] Int. Cl.[6] ............................................... G02F 1/1335
[52] U.S. Cl. ........................................... 349/66; 349/112
[58] Field of Search ............................ 359/68, 40, 41; 349/62, 66, 112

[56] References Cited

U.S. PATENT DOCUMENTS 5,349,453  9/1994  Munakata ........................... 359/40
5,504,597  4/1996  Sprague ............................. 349/112

OTHER PUBLICATIONS

Bahadur, Birendra "Liquid Crystals: Applications And Uses" vol. 3, pp. 267–275 1992.

Primary Examiner—William L. Sikes
Assistant Examiner—James Dudek
Attorney, Agent, or Firm—Christie, Parker & Hale, LLP

[57] ABSTRACT

A color LCD system includes an LCD cell, a color filter, and a light collecting member. The LCD cell includes a pair of panels, a pair of transparent electrodes facing each other and being disposed on the panels, respectively, and a pair of orientation layers covering the transparent electrodes, respectively, a color filter attached to an outer face of the LCD cell and having red, green, and blue filter layers each of which has the same centerline as that of the transparent electrode. The light collecting member is disposed between the color filter and a light source to improve light effect.

9 Claims, 4 Drawing Sheets

LIQUID CRYSTAL CELL WITH AN EXTERNAL COLOR FILTER

CROSS-REFERENCE TO RELATED APPLICATION

This is a continuation of application Ser. No. 08/541,422, filed Oct. 10, 1996 now abandoned.

BACKGROUND OF THE INVENTION

1. Field of the Invention

The present invention relates generally to a liquid crystal display (LCD) system to which a color filter is attached, and more particularly to an LCD system displaying an image using the characteristic of twist or dispersion of liquid crystals under the effect of an electric field.

2 Description of Related Art

Referring to FIG. 7, there is illustrated a conventional LCD system which comprises an LCD cell having a pair of panels 1a and 1b, transparent electrodes 2a and 2b, disposed on the panels 1a and 1b, respectively, and a pair of orientation layers 6a and 6b covering the transparent electrodes 2a and 2b, respectively.

A pair of polarizers 5a and 5b are also provided on either side of the cell, covering the respective orientation layers 6a and 6b. Typically, the transparent electrodes will be comprised of indium tin oxide.

A color filter layer 3 is provided between the panel 1a and the transparent electrode 2a. The color filter layer 3 is formed with red R, green G, and blue B patterns which are arranged alternatively.

A frit seal (not shown) is provided between the panels 1a and 1b for sealing and maintaining a predetermined gap between the panels 1a and 1b. Typically, the liquid crystal material 4 is injected between the panels 1a and 1b through an inlet provided in the frit seal, which is sealed by a sealing material after injection of the liquid crystal material 4.

Due to the inherent characteristics of the liquid crystal material 4 the cell gap formed between the pair of panels 1a and 1b must be very small yet very uniform and precise, requiring manufacture to extremely fine tolerances. As a result, the manufacturing cost of such a conventional LCD color system is undesirably high.

For example, in the case of a super twisted nematic (STN) LCD, the cell gap is generally formed within a range from about 4.5 to 7 μm, within which a pair of transparent electrodes, a pair of orientation layers, a color filter, and a layer for protecting the color filter should be disposed.

The color filter itself has a thickness within a range from 1 to 1.5 μm. Forming such color filter within the cell gap is extraordinarily difficult and time consuming, and includes the difficult task of flattening the surface of the color filter within the very small cell gap.

Such problems are even more apparent in the case of a ferroelectric liquid crystal FLC, where the cell gap is typically less than 2 μm so that it is more difficult to form the color filter within the much smaller cell gap.

For such an FLC system, a special micro-class color filter must be used which substantially increases the manufacturing cost of the LCD. Typically, about 50% of the entire manufacturing cost of LCD relates to fabricating the color filter.

SUMMARY OF THE INVENTION

It is an object of the present invention to provide a color LCD system which substantially reduces manufacturing costs and may be fabricated with less exacting tolerances than required for a conventional LCD system.

It is a related object of the present invention to provide such a color LCD system that may be fabricated through a much simpler fabrication process than a conventional LCD system.

It is another object of the present invention to provide a color LCD system with an improved light effect.

The above and additional objects are realized in accordance with the present invention which provides a color LCD system comprising an LCD cell including a pair of panels, a pair of transparent electrodes facing each other and being disposed on the panels, respectively, and a pair of orientation layers covering the transparent electrodes, respectively.

According to an important feature of the present invention, the color filter is attached to an outer face of the LCD cell. The color filter has red, green, and blue filter layers each of which are aligned with corresponding transparent electrodes with the cell.

According to another important feature of the invention, there is further provided means for collecting light emitted from a light source.

According to one embodiment of the invention, the color LCD system includes a color filter having a black matrix disposed between each red, green, and blue filter layer segments.

According to another feature of the present invention, the color LCD system includes a pair of protection layers disposed on opposite faces of the color filter, respectively.

In a further feature of the present invention, a light collecting means is provided which significantly enhances the light effect of the LCD system.

According to a preferred embodiment, the light collecting means is in the form of a great plurality of convex micro lenses each of which is aligned with corresponding red, green or blue filter layer segments.

According to yet another feature of the invention, there is also provided a light diverging means disposed between the light collecting means and the light source which further enhances the light effect of the LCD system.

BRIEF DESCRIPTION OF THE DRAWINGS

The foregoing and other objects of the present invention will become apparent from the detailed description below when taken in conjunction with the followings drawings in which.

DETAILED DESCRIPTION OF THE INVENTION

While the invention will be described and illustrated in connection with certain preferred embodiments and examples, it should be understood that it is not intended to limit the invention to those particular embodiments and examples. To the contrary, it is intended to cover all alternatives, modifications and equivalents falling within the spirit and scope of the invention as defined by the appended claims.

Reference will now be made in detail to the present invention, examples of which are illustrated in the accompanying drawings. Wherever possible, the same reference numbers will be used throughout the drawings to refer to the same or like parts.

Figure 1:
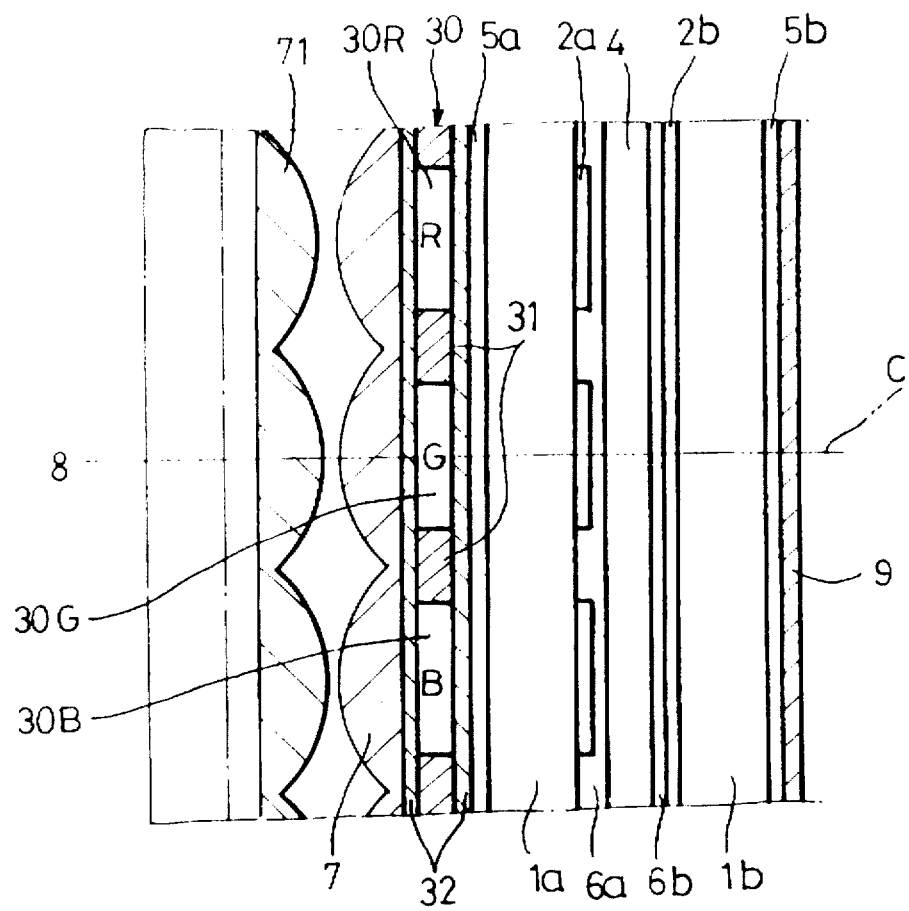
FIG. 1 is a sectional view of a color LCD system in accordance with a first embodiment of the present invention.

Referring first to FIG. 1, there is illustrated the novel color LCD system according to a first embodiment of the present invention. The LCD system includes an LCD cell having a pair of panels 1a and 1b, a pair of transparent electrodes 2a and 2b facing each other and disposed on the panels 1a and 1b, respectively, a pair of orientation layers 6a and 6b covering the transparent electrodes, respectively, and a liquid crystal material 4 disposed between the orientation layers 6a and 6b.

Polarizers 5 and 5a are attached to each outer surface of the panels 1a and 1b of the LCD cell, respectively.

According to a preferred embodiment of the invention, the transparent electrodes will be comprised of indium tin oxide (ITO). A light source for the LCD system in the form of a back light 8 is provided. The back light 8 may be any of a variety of conventional back light systems.

In addition, a diffuser 9 is disposed upon the outer surface of the panel 1b, i.e., on the front face of the LCD cell, to increase the effective viewing angle of the LCD system.

According to an important feature of the invention that represents a substantial departure from convention, color filter 30 is disposed outside of the LCD cell. The color filter 30 is disposed between the back light 8 and the polarizer 5a. The color filter 30 includes red (R), green (G), and blue (B) filter segments 30R, 30G, and 30B.

In addition, according to a preferred embodiment of the invention a black mask 31 is disposed between each filter segment as illustrated.

In the illustrated embodiment, the color filter 30 is illustrated as disposed in a stripe by way of example. As should be evident, in accordance with the present invention, the color filter 30 may be disposed in the pattern of a matrix or in any other suitable or conventional manner.

According to an important aspect of the present invention, the color filter 30 may be manufactured separately from the LCD cell. Preferably, the black mask 31 is made of graphite to prevent interference between the red 30R, green 30G and blue 30B filter layer segments.

In addition, a protection layer 32 is preferably provided, disposed on both surfaces of the color filter 30 to protect the color filter 30.

In order to provide proper operation of the LCD system, the red 30R, green 30G, and blue 30B filter segments are disposed such that they are aligned with corresponding electrodes 2a.

As illustrated in FIG. 1 with respect to a particular green 30G filter layer segment, the center of the green 30G filter layer segment is aligned with a corresponding electrode 2a.

According to an important feature of the present invention, a unique light collecting member 7 is provided between the color filter 30 and the back light 8. The light collecting member has a plurality of micro convex lenses each of which is aligned with corresponding R, G and B color filter layer segments 30R, 30G and 30B.

In addition, a complementary light diverging member 71 is disposed between the light collecting member 7 and the back light 8. The light diverging member 71 has the straight travelling characteristics of the light from the light source 8.

Similar to the light collecting member 7, the light diverging member 71 is comprised of a plurality of micro convex lenses each of which are aligned with a corresponding micro convex lens of the light collecting member 7, which, in turn, is aligned with corresponding color filter layer segments 30. As illustrated, the micro convex lenses of the light collecting member 7 and the micro convex lenses of the light diverging member 71 are disposed in a complementary manner.

By this technique, the light generated from the light source 8 is collimated and effectively directed through the color filter layer segments 30.

Figure 2:
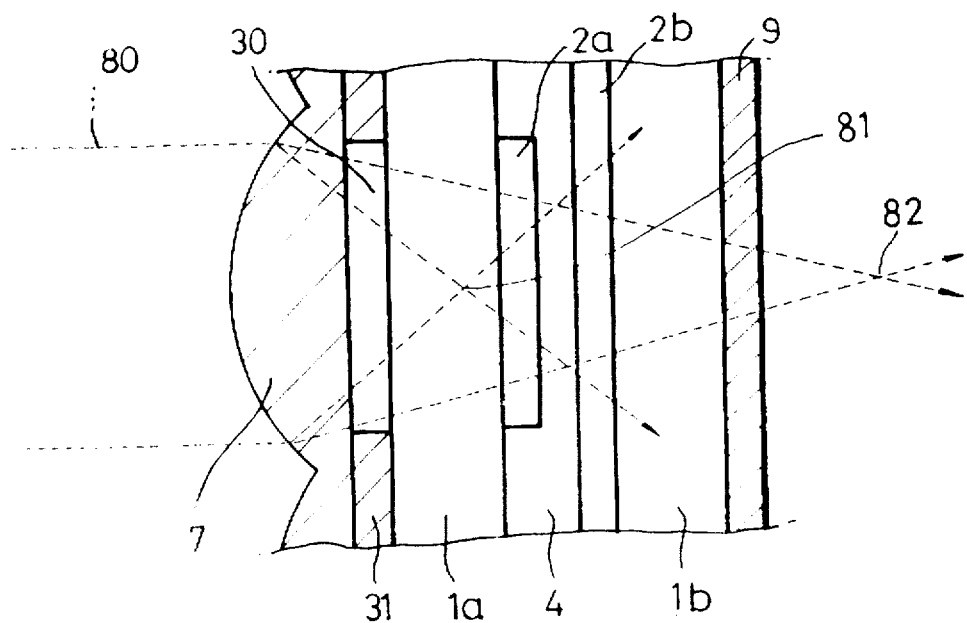
FIG. 2 is a sectional view illustrating the operation of the LCD system depicted in FIG. 1.

FIG. 2 illustrates in more detail the advantageous operation of the color LCD system of the present invention according to the embodiment depicted in FIG. 1.

Light rays 80, which are emitted from the back light 80 and pass through the light diverging member 71, approach the micro convex lenses of the light collecting member 7 in a generally parallel manner. The light is directed through the micro convex lenses of the light collecting member 7 at a predetermined focus length and then passes through the color filter segments 30 and illuminates the back of the LCD cell.

The light which is colorized while passing through the color filter 30 displays an image in response to orientation of the liquid crystal material which is selectively manipulated and determined by the electric field formed between the electrodes 2a and 2b.

As shown in dotted lines of FIG. 2, each micro convex lens of the light collecting member 7 according to the present invention will preferably have a focus length 81 within a range between a first focal length 82 which is approximately one-half the length from the micro lens 7 to the electrode 2a, and a second focal length 82 which is approximately twice the length from the micro lens 7 to the electrode 2a.

In other words, the micro lens 7 preferably has a focus range so that the light passing through the color filter 30 does not deviate from the electrode 2a.

If the focal length is less than one-half the length from the micro lens 7 to the electrode 2a or more than twice the length from the micro lens 7 to the electrode 2a, the light passing through each R, G, B filter layer segment cannot pass through the corresponding transparent electrode 2a, thereby resulting in undesirable interference of the light rays.

Figure 3:
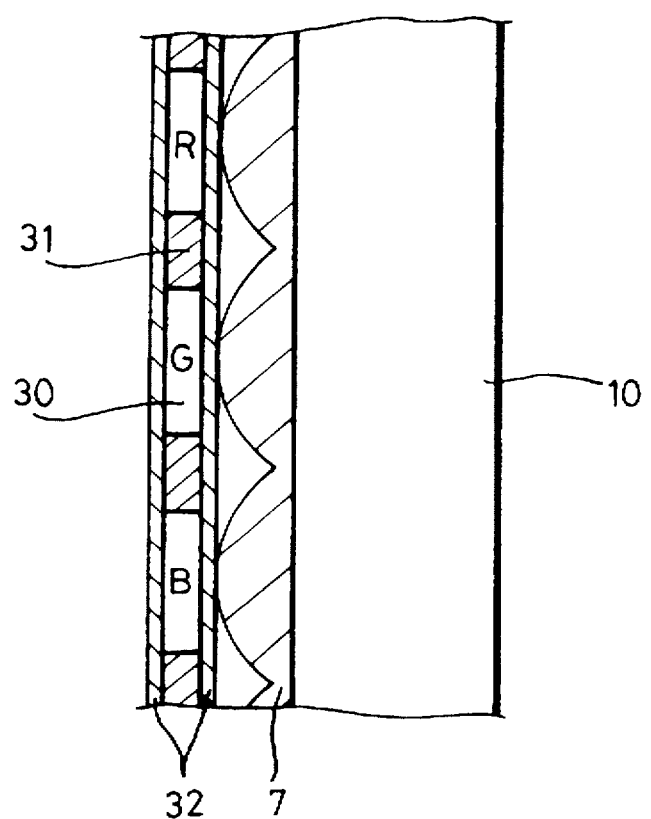
FIG. 3 is a sectional view of a color LCD system in accordance with a second embodiment of the present invention.

FIG. 3 shows a color LCD system according to a second embodiment of the present invention. According to this embodiment, the light collecting member 7 is disposed between the LCD cell 10 and the color filter 30 having the R, G, and B filter layer segments. The operational effect of this embodiment is similar to that of the first embodiment.

Figure 4:
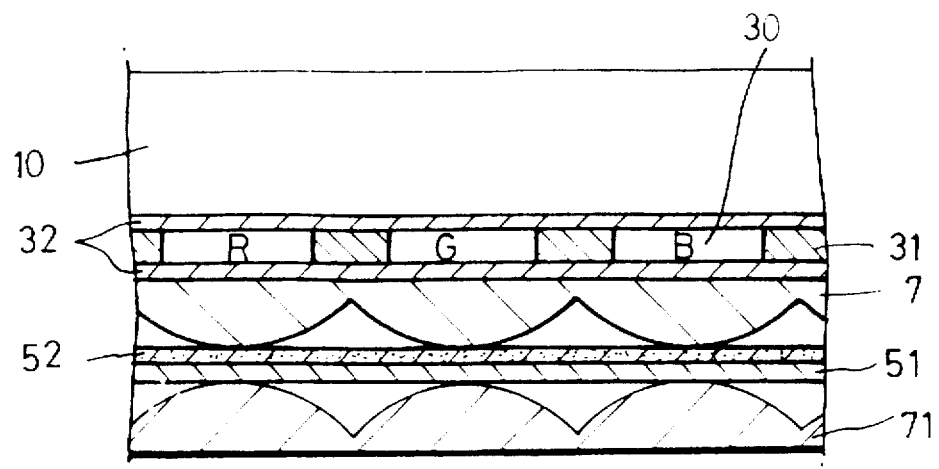
FIG. 4 is a sectional view of a color LCD system in accordance with a third embodiment of the present invention.

FIG. 4 shows a color LCD according to a third embodiment of the present invention. According to this embodiment, a polarizer 51 and a compensation film 52 are disposed between the light collecting member 7 and the light diverging member 71.

Figure 5:
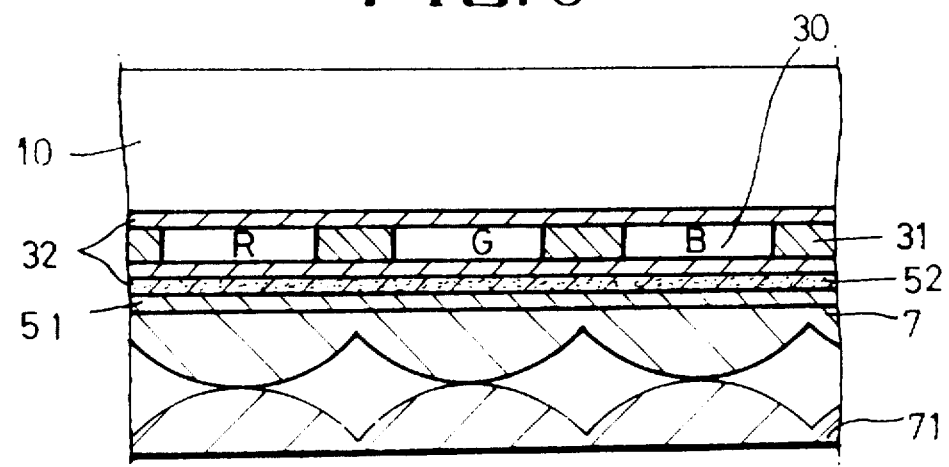
FIG. 5 is a sectional view of a color LCD system in accordance with a fourth embodiment of the present invention.

According to a fourth embodiment of the present invention as shown in FIG. 5, between the light collecting member 7 and the color filter layer 30, the polarizer 51 and the compensation film 52 are disposed.

Figure 6:
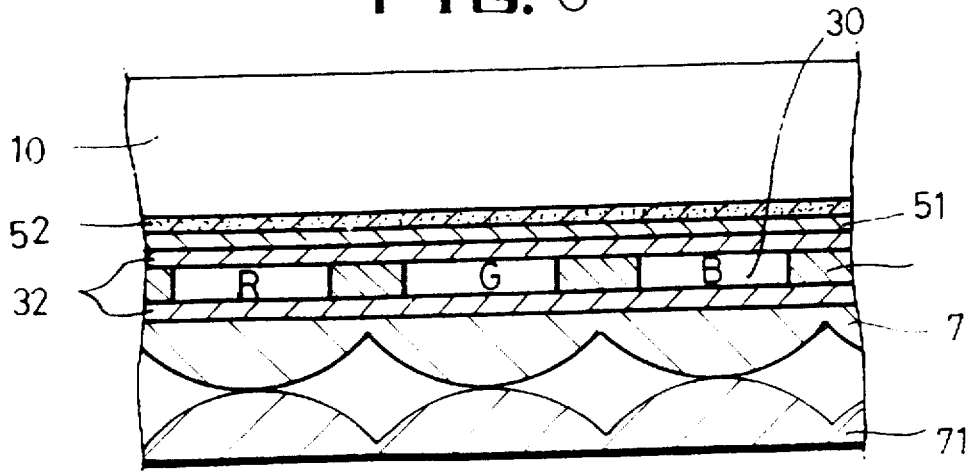
FIG. 6 is a sectional view of a color LCD system in accordance with a fifth embodiment of the present invention.
Figure 7:
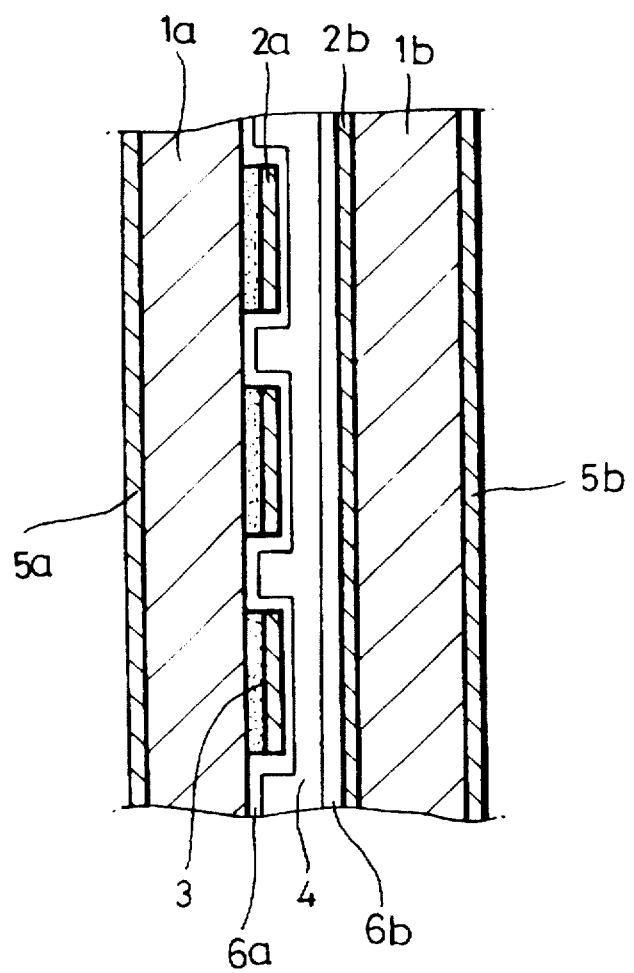
FIG. 7 is a sectional view of a conventional LCD system.

According to a fifth embodiment of the present invention as shown in FIG. 6, the polarizer 51 and the compensation film 52 are disposed between the color filter 30 and the LCD cell 10.

As described above, the color LCD system of the present invention includes a color filter which is disposed between the back light and the LCD cell, greatly simplifying the manufacturing process and resulting in a substantial reduction in manufacturing cost.

In addition, the color LCD system of the invention is preferably provided with a light collecting member for collecting light from the back light and directing it through the corresponding color filter segments and the electrodes, thereby greatly improving the light effect of the LCD system.

According to another advantageous feature of the invention, the color filter, which is not disposed within the LCD cell, can be recycled even if the LCD cell malfunctions.

In addition, the micro convex lenses of the light collecting member and the light diverging member may be fabricated in sheets which are applied to the LCD cell and aligned during the assembly process.

It will be apparent to those skilled in the art that various modifications and variations can be made in the LCD system of the present invention and in construction of this system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A color LCD system adapted to operate in connection with a light source, said color LCD system comprising:
   an LCD cell including:
      a first panel and a second panel spaced apart from each other and extending generally parallel to each other,
      a first set of transparent electrodes and a second set of transparent electrodes disposed between said first panel and said second panel,
      a first orientation layer substantially covering at least one surface of said first set of transparent electrodes and a second orientation layer substantially covering at least one surface of said second set of transparent electrodes, and
      a liquid crystal material disposed between said first set of transparent electrodes and said second set of transparent electrodes;
   a color filter attached to an outer face of the LCD cell comprising red, green, and blue filter layer segment, each of with is aligned with a corresponding electrode of said first set of transparent electrodes;
   light collecting means for directing light through said filter layer segments of said color filter means, wherein said light collecting means comprises a plurality of convex micro lenses, each of which is aligned with a corresponding filter layer segment of said color filter;
   light diverging means, disposed between said light collecting means and said light source, for converting light from said light source into collimated light and directing the collimated light to the light collecting means, thereby enhancing light collecting efficiency of the light collecting means; and
   a diffuser attached to an outer face of the LCD cell opposite to said light source.

2. The color LCD system of claim 1 wherein the color filter further comprises a black mask disposed between each red, green, and blue filter layer segment of said color filter.

3. The color LCD system of claim 1 further comprising a first protection layer attached to and substantially covering one surface of said color filter and a second protection layer attached to and substantially covering the other surface of said color filter.

4. The color LCD system of claim 1 wherein the focal length of substantially all of the convex lenses of the light collecting means is in a range from between about one-half to twice the distance of the micro lens to a corresponding transparent electrode.

5. The color LCD system of claim 1 further comprising a polarizing layer and a compensation layer disposed between the light collecting means and the color filter.

6. A color LCD system comprising:
   an LCD cell defined by a first and a second panel, said LCD cell comprising:
      a first electrode and a second electrode disposed substantially between said first panel and said second panel, wherein at least said first electrode is comprises of a plurality of first electrode segments, and
      a liquid crystal material disposed between said first electrode and said second electrode;
   a color filter comprising a plurality of red, green and blue color filter segments, said color filter being disposed substantially adjacent to said LCD cell so that substantially all of said filter segments are aligned with corresponding first electrode segments;
   a light source;
   a first plurality of convex micro lenses for collecting light and directing the light to said color filter, wherein substantially each of said first plurality of convex micro lenses is aligned with a corresponding color filter segment of said color filter;
   a second plurality of convex micro lenses, disposed between said first plurality of convex micro lenses and said light source, for converting light from said light source into collimated light and directing the collimated light to the first plurality of convex micro lenses, thereby enhancing light collecting efficiency of the first plurality of convex micro lenses; and
   a diffuser attached to an outer face of the LCD cell opposite to said light source.

7. The color LCD system of claim 6 wherein said second plurality of convex micro lenses are disposed in a complementary manner to and in substantial alignment with said first plurality of convex micro lenses.

8. The color LCD system of claim 6 wherein said color filter further comprises a black mask disposed between substantially each color filter segment of said color filter.

9. The color LCD system of claim 6 wherein said color filter further comprises a protection layer attached to and substantially covering at least one surface of said color filter.

* * * * *

UNITED STATES PATENT AND TRADEMARK OFFICE
CERTIFICATE OF CORRECTION

PATENT NO. : 5,796,451
DATED : August 18, 1998
INVENTOR(S) : Si-hwan Kim

It is certified that error appears in the above-indentified patent and that said Letters Patent is hereby corrected as shown below:

Item 56, References Cited, U.S. Patent Documents, add the following cited references:
-- 4,818,075   4/1989   Takao et al. . . . . . . 359/68
   4,876,165   10/1989  Brewer et al. . . . . . 359/68
   5,128,783   7/1992   Abileah et al. . . . . . 359/40
   5,276,538   1/1994   Monji et al. . . . . . . 359/40
   5,442,467   8/1995   Silvetstein et al . . . 359/68 --.

Item 56, References Cited, Foreign Patent Documents, add the following cited references:
-- 63,60427    3/1986   JP   Matsumoto . . 359/68
   5-341270    12/1993  JP   Mori . . . . . . . 359/68
   2 279 171   12/1994  JP   Kim . . . . . . . . 359/40 --.

Column 1, line 16, change "2Description" to -- 2. Description --.
Column 2, line 48, change "followings" to -- following --.

UNITED STATES PATENT AND TRADEMARK OFFICE
CERTIFICATE OF CORRECTION

PATENT NO. : 5,796,451
DATED : August 18, 1998
INVENTOR(S) : Si-hwan Kim

It is certified that error appears in the above-indentified patent and that said Letters Patent is hereby corrected as shown below:

Column 3, line 61, replace "such" with -- so --.
Column 6, line 30, before "comprises" delete "is".

Signed and Sealed this

Thirtieth Day of November, 1999

Attest:

Q. TODD DICKINSON

Attesting Officer

Acting Commissioner of Patents and Trademarks